Dec. 28, 1937.   A. J. PARK   2,103,867
RESILIENT WHEEL
Filed July 2, 1934   2 Sheets-Sheet 1
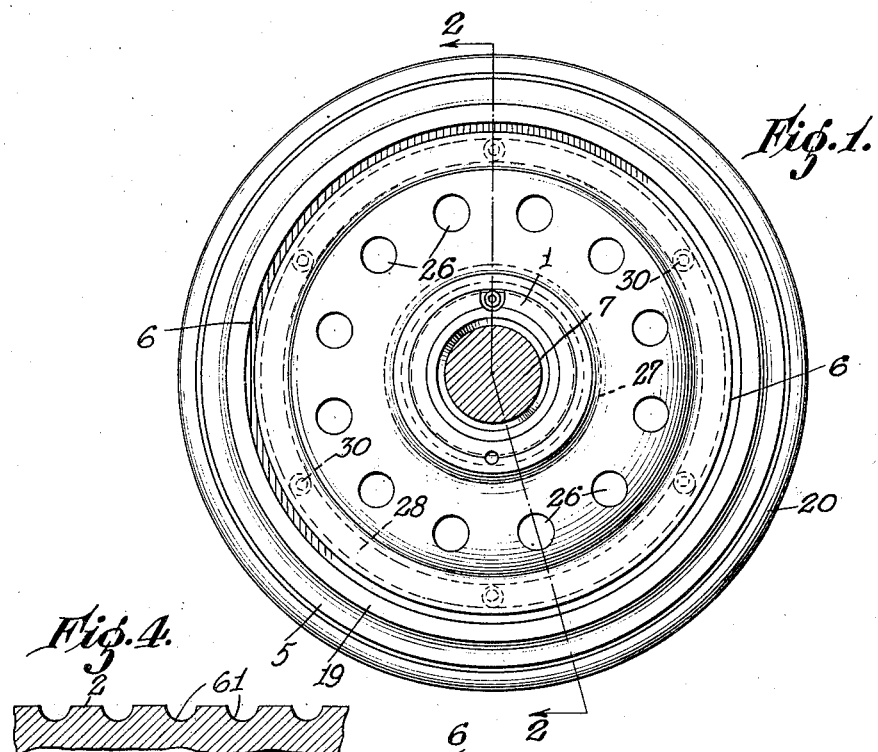
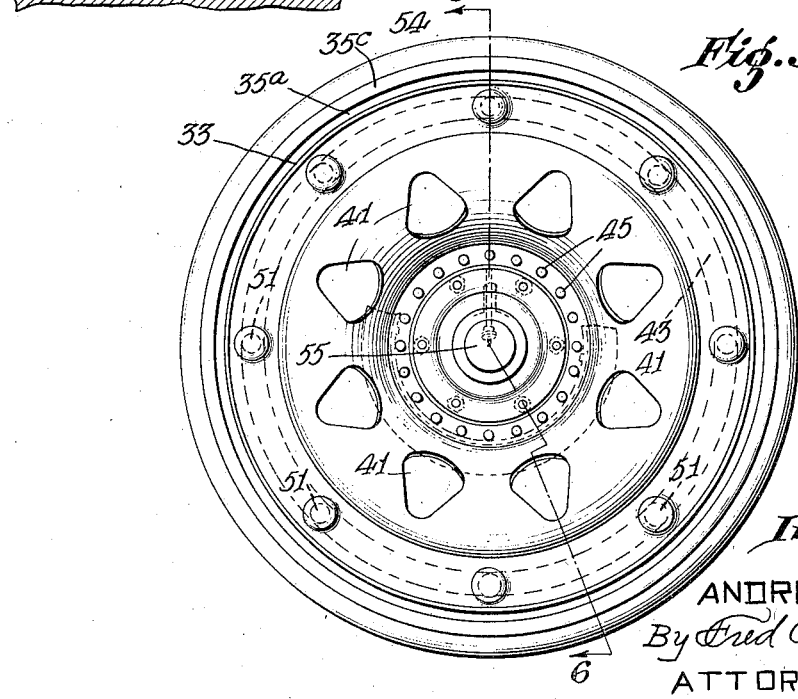
Inventor:
ANDREW J. PARK
By Fred E. Mefford
ATTORNEY Dec. 28, 1937. A. J. PARK 2,103,867
RESILIENT WHEEL
Filed July 2, 1934 2 Sheets-Sheet 2
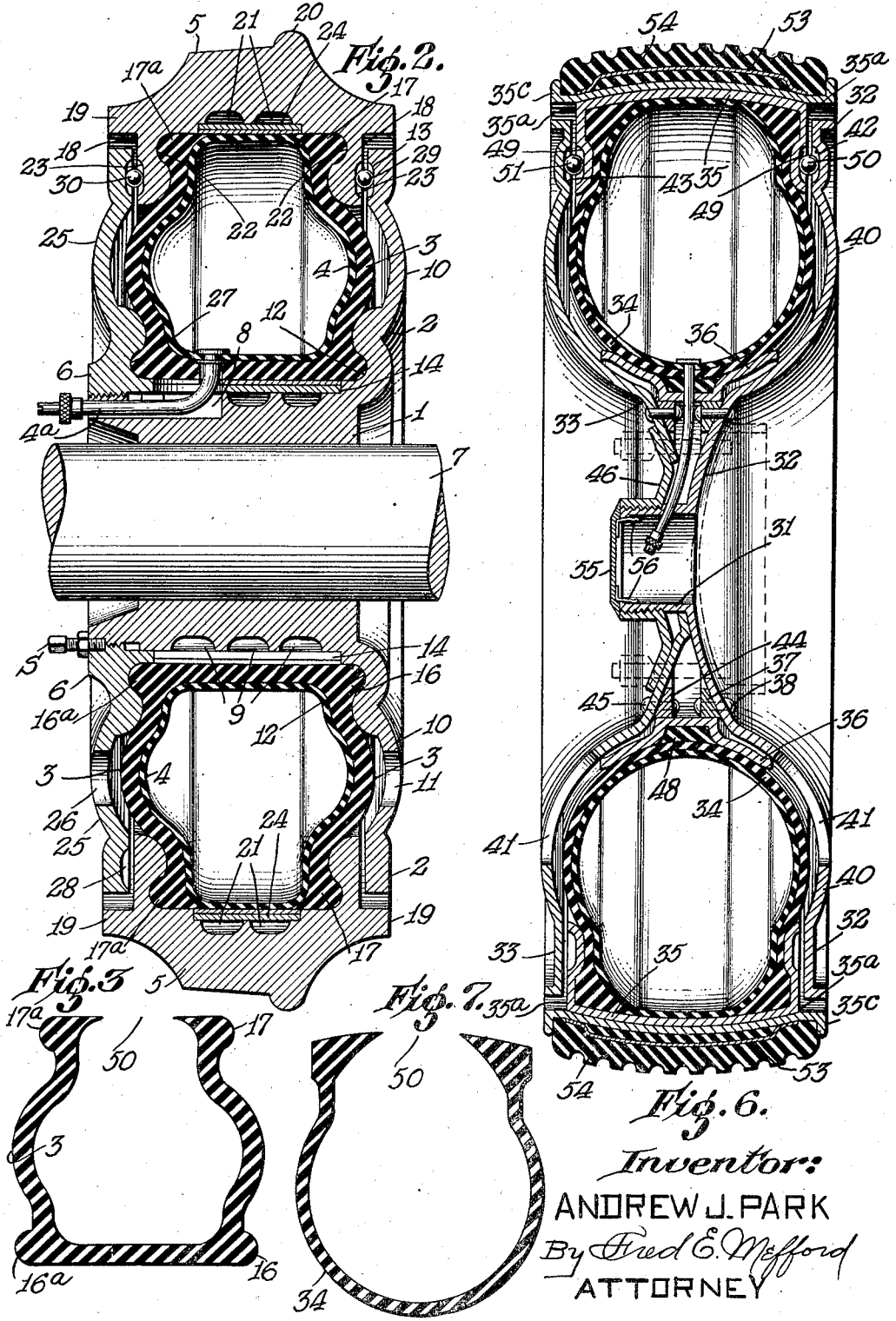
Inventor:
ANDREW J. PARK
By Fred E. Mefford
ATTORNEY Patented Dec. 28, 1937

2,103,867

UNITED STATES PATENT OFFICE 2,103,867

RESILIENT WHEEL

Andrew J. Park, Pueblo, Colo.

Application July 2, 1934, Serial No. 733,350

11 Claims. (Cl. 152—41)

My invention relates to resilient wheels and my object is to provide a simple and durable steel structure resilient wheel having a pneumatic tire casing interlocked with said rim and other parts of the steel structure in a manner to hold said rim in proper position and alignment by equal pressure in the tire casing.

Reference is here made to my co-pending application Serial No. 663,620.

Figure 1 represents a side elevation of a wheel adapted for use on railways; Fig. 2, a cross sectional elevation on the line 2—2 in Fig. 1; Fig. 3, a cross sectional elevation of a tire casing adapted for use in the wheel shown in Figs. 1 and 2; Fig. 4, a fragmentary view showing the corrugations; Fig. 5, a side elevation of a wheel adapted for use on highway vehicles; Fig. 6, a cross sectional elevation on the liner 6—6 in Fig. 5; and Fig. 7, a cross sectional elevation of a tire casing adapted for use in the wheel shown in Figs. 5 and 6.

Although I have shown the preferred embodiments of my invention, I do not thereby limit myself to the precise details shown, but wish it understood that within the scope of what hereinafter claimed, various changes in the precise details of construction may be made without departing from the spirit of the invention.

The adaptation shown in Figs. 1 and 2 comprises a hub portion 1 provided with a peripheral flange 2; a pneumatic tire casing 3 containing an inner tube 4; a rim 5, and a side plate 6.

The hub portion 1 is mounted on an axle 7 and is provided with a valve stem exit 8 and a series of peripheral grooves 9. The peripheral flange 2 has a convex concave portion 10, a series of cooling vents 11, an annular bead receiving channel 12, and a series of ball retaining pockets 13. A band 14 is disposed on hub portion 1 over peripheral grooves 9 so as to form dead air spaces in grooves 9.

The pneumatic tire casing 3 is provided with an endless slot 50 in its outer periphery and has an inner bead 16 and an outer bead 17 on one exterior side and a similar inner bead 16a and an outer bead 17a on the opposite exterior side. The casing 3 is disposed on band 14 so that inner bead 16 fits into annular channel 12. The inner tube 4 is disposed in casing 3 so that the valve stem 4a emerges through valve stem exit 8. The rim 5 is provided with a pair of internal flanges 18, a pair of external flanges 19, an external rail guide flange 20, and a series of internal grooves 21. Each internal flange 18 is provided with a bead receiving channel 22 and a series of ball retaining pockets 23. A hoop 24 is disposed in rim 5 so as to cover internal grooves 21 and form dead air spaces in grooves 21. Rim 5 is disposed on tire casing 3 so that outer beads 17 and 17a fit into bead receiving channels 22.

The side plate 6 has a convex concave portion 25 containing a series of cooling vents 26 and provided with an annular bead receiving channel 27 and a ball receiving channel 28. Side plate 6 is screwed on hub portion 1 so that the adjacent inner bead 16a of casing 3 fits into bead receiving channel 27.

A steel ball 29 is disposed in each pair of registering ball retaining pockets 13—23 and a steel ball 30 is disposed in each ball retaining pocket 23 and the adjacent ball receiving annular channel 28.

A set screw S is screwed into hub portion 1 and side plate 6 to hold side plate 6 from unscrewing.

In some modifications I construct corrugations 61 on peripheral flange 2, internal flanges 18, and side plate 6. The corrugations 61 are located adjacent to the bead receiving channels 22 in the internal flanges 18, and adjacent to bead receiving channel 12 in peripheral flange 2, and adjacent to bead receiving channel 28 in side plate 6. When the beads of the tire casing press against the corrugations 61, it is evident that the casing 3 cannot slip relative to the peripheral flange 2, the rim 5 or the side plate 6.

The clearance afforded by the convex concave portions 10 and 25 in the peripheral flange and side plate, respectively, permits the casing to bulge sidewise so as to afford the desired resiliency.

The balls not only afford anti-friction means but also maintain clearance between peripheral flange 2 and the adjacent internal flange of rim 5, and between side plate 6 and the adjacent internal flange of rim 5.

The cooling vents 11—26 permit the atmosphere to come in contact with casing 3 and carry off heat. The dead air spaces in grooves 9—21 afford insulation against heat from hub portion 1 and rim 5, which would otherwise increase the temperature of the casing 34 and inner tube 4.

The modification shown in Figs. 5 and 6, comprises a hub portion 31 provided with a peripheral flange 32; a side plate 33; an auxiliary side plate 46; a pneumatic tire casing 34; a main rim 35; a split rim 36; and an auxiliary rim 35c.

Peripheral flange 32 is provided with a ring 37 secured thereto by rivets 38. The peripheral flange 32 has a concave convex portion 40, a series of cooling vents 41, and a circular row of ball retaining pockets 42. The side plate 33 is provided with a ball receiving annular channel 43 and is mounted on hub portion 31. A ring 44 is secured to side plate 33 by rivets 45. The auxiliary side plate 46 is screwed on hub portion 31 against side plate 33. A split rim 36 is mounted on rings 37—44 and a strip 48 disposed in split rim 47.

The pneumatic tire casing 34 has an endless slot in its outer periphery and is disposed on strip 48 between peripheral flange 32 and side plate 33 as shown in Fig. 6.

The main rim 35 is provided with a pair of internal flanges 35a containing a series of ball retaining pockets 49 and is disposed on the pneumatic tire casing 34 so that each ball retaining pocket 49 in peripheral flange 32 registers with a ball retaining pocket 42 in the adjacent internal flange 35a, and the ball receiving annular channel 43 registers with the adjacent ball receiving pockets 42. A steel ball 50 is disposed in each pair of registering ball retaining pockets 49—42, and a steel ball 51 is disposed in each ball retaining pocket 49 and the adjacent ball receiving annular channel 43 in side plate 33.

The auxiliary rim 35a is provided with a series of anchoring brackets 53 and is mounted on main rim 35. A tread 54 is mounted on auxiliary rim 35a and is anchored thereto by brackets 53. A cap 55 is disposed against hub portion 31 and an auxiliary side plate 46 and is held in position by latch springs 56.

The balls afford an electrical contact so that electrical safety devices can be operated and also serve as a gauge control, and keep the wheel in perfect alignment in rounding curves for the reason the balls afford radial movement while the wheel is in any position. This wheel will be found a non-conductor of traffic noise.

This wheel will be found useful for engine drivers and line shaft pulleys as the momentum will not serve to throw the wheel apart.

In use, there is a great deal of friction between the peripheral portion of the inner tube and the adjacent peripheral portion of the conventional casing. The friction produces heat which causes the structure of the peripheral portion of the casing to deteriorate before the side portions wear out. By eliminating a part of the peripheral portion of the casing, the deterioration of that portion cannot take place since it is not present to rub against the inner tube and produce heat. The service life of the casing, therefore, is greater than if I used the conventional tire casing with the solid periphery.

I claim:

1. In a wheel of the class described the combination of a hub portion provided with a series of peripheral grooves a valve stem exit and a peripheral flange; said peripheral flange having a convex concave portion containing a plurality of cooling vents, an annular channel adjacent to said hub portion and a series of ball retaining pockets, a band disposed on said hub portion over said peripheral grooves so as to form dead air spaces in said peripheral grooves; a pneumatic tire casing, having an inner and an outer bead on each exterior side, disposed on said band so that the adjacent inner bead of said tire casing fits in said annular channel in said peripheral flange; an inner tube disposed in said casing so that the valve stem emerges through said valve stem exit; a rim provided with a pair of internal flanges, a pair of external flanges, an external rail guide flange, and a series of internal grooves, each internal flange being provided with an annular channel, and a series of ball retaining pockets, said rim being disposed on said tire casing so that each outer bead of said casing fits into an annular channel of each internal flange of said rim; a hoop disposed within said rim so as to cover said internal grooves and form dead air spaces within said internal grooves; a side plate having a convex portion containing a series of cooling vents and provided with an annular bead receiving channel and an annular ball receiving channel, said side plate being mounted on said hub portion so that the adjacent inner bead of said casing fits into the bead receiving channel of said side plate; a ball disposed in each pair of registering ball retaining pockets in said peripheral flange of said hub portion and the adjacent internal flange of said rim; and a ball disposed in each ball retaining pocket in the remaining internal flange of said rim and the annular ball receiving channel of said side plate.

2. In a wheel of the class described, the combination of a hub portion provided with a series of peripheral grooves and a peripheral flange; a band disposed around said hub portion over said peripheral grooves so as to form dead air spaces in said grooves; a side plate mounted on said hub portion; a pneumatic tire casing disposed between said peripheral flange and said side plate; a rim, provided with internal grooves and a pair of internal flanges, mounted on said pneumatic tire casing so that said internal flanges are between said peripheral flange and said side plate; and a hoop disposed in said rim so as to cover said internal grooves and form dead air spaces in said internal grooves.

3. In a resilient wheel, the combination of a hub portion provided with a peripheral flange and a series of peripheral grooves; a band disposed about said hub portion so as to cover said peripheral grooves and form dead air spaces; an annular bead receiving channel in said peripheral flange; a tire casing, provided with an outer and an inner bead on each exterior side, disposed on said hub portion so that the inner bead of one side fits into the annular bead receiving channel in said peripheral flange; a side plate, provided with a series of cooling vents and an annular bead receiving channel, mounted on said hub portion so that the annular bead receiving channel fits over the adjacent inner bead of said tire casing; a rim, provided with a pair of internal flanges and internal grooves, mounted on said tire casing so that said internal flanges are between said peripheral flange and said side plate; and a hoop disposed in said rim so as to cover said internal grooves and form dead air spaces.

4. In a resilient wheel, the combination of a hub portion having a series of peripheral grooves and a peripheral flange provided with an annular bead receiving channel; a band disposed over said peripheral grooves so as to form dead air spaces; a side plate, having an annular bead receiving channel, mounted on said hub portion; a tire casing, having an outer and an inner bead on each exterior side, mounted between said peripheral flange and said side plate so that one inner bead fits into the annular channel in said peripheral flange and the other inner bead fits into the annular channel in said side plate; a rim, having a pair of internal flanges and a series of internal grooves, each internal flange having a bead receiving channel, said rim being mounted on said tire casing so that each outer bead fits into a channel in one internal flange of said rim; and a hoop disposed in said rim so as to cover said internal grooves to form dead air spaces.

5. In a wheel, the combination of a hub portion having a series of peripheral grooves; a band disposed over said grooves to form dead air spaces; a peripheral flange on said hub portion provided with an annular bead receiving channel, a series of ball retaining pockets; a side plate, provided with an annular bead receiving channel, and an annular ball receiving channel, said side plate being mounted on said hub portion; a tire casing having an inner bead and an outer bead on each exterior side; a rim provided with internal channels, and a pair of internal flanges provided with bead receiving channels, and ball retaining pockets, said rim being disposed on said casing so that each outer bead fits into an adjacent bead receiving channel in said rim and each ball retaining pocket registers with a ball retaining pocket in said peripheral flange and said ball receiving channel in said side plate registers with the ball retaining pockets in the adjacent internal flange of said rim; and a ball disposed in each ball retaining pocket and the adjacent ball receiving channel, and a ball disposed in each registering ball retaining pocket.

6. In a wheel of the class described, the combination of a hub portion provided with a series of peripheral grooves; a band covering said grooves so as to form dead air spaces; a peripheral flange on said hub, said flange being provided with a series of ball retaining pockets, and a bead receiving channel; a side plate mounted on said hub portion and provided with an annular ball receiving channel, a bead receiving channel; a tire casing, having an outer and an inner bead on each exterior side, mounted between said peripheral flange and said side plate so that one inner bead of said casing fits into the bead receiving channel in said flange and the other inner bead fits into the bead receiving channel in said side plate; a rim having a pair of internal flanges provided with ball retaining pockets and annular bead receiving channels, mounted on said tire casing so that each outer bead fits into the adjacent bead receiving channel in the adjacent internal flange; a ball disposed in each pair of ball retaining pockets in said peripheral flange and the adjacent internal flange of said rim; a ball disposed in each ball retaining pocket adjacent to said annular ball receiving channel in said side plate; an auxiliary rim, provided with a series of anchoring brackets; a tread mounted on said auxiliary rim and anchored thereto by said brackets.

7. In a resilient wheel, the combination of a hub portion provided with a series of peripheral grooves; a band over said grooves to form dead air spaces; a peripheral flange on said hub portion, said flange being provided with an annular bead receiving channel, a row of corrugations adjacent to said bead receiving channel, a side plate mounted on said hub portion and provided with an annular bead receiving channel; a row of corrugations adjacent to the annular bead receiving channel in said side plate; a tire casing, provided with an outer and an inner bead on each exterior side, mounted between said peripheral flange and said side plate, said casing being provided with a row of corrugations adjacent to each bead and being disposed so that each inner bead fits into the adjacent bead receiving channel and the corrugations fit into the adjacent corrugations in said peripheral flange and said side plate; a rim, provided with a pair of internal flanges and a series of internal grooves, each internal flange being provided with an annular bead receiving channel and a row of corrugations adjacent to each bead receiving channel, said rim being disposed on said tire casing so that the adjacent corrugations of said internal flanges fit into the corrugations on said casing and the adjacent bead receiving channel fits over the outer bead of said casing; a rim disposed in said rim so as to cover said internal grooves and form dead air spaces.

8. In a resilient wheel, the combination of a hub portion having a peripheral flange; a side plate secured to said hub portion; a pneumatic tire casing, having an endless slot in its outer periphery, mounted between said side plate and the peripheral flange of said hub portion; and a main rim, having a pair of internal flanges, mounted on said tire casing so that said internal flanges are disposed between said side plate and the peripheral flange of said hub portion.

9. In a resilient wheel, the combination of a hub portion having a peripheral flange; a side plate secured to said hub portion; a pneumatic tire casing, having an endless slot in its outer periphery and provided with an annular bead along each peripheral edge, mounted between said side plate and the peripheral flange of said hub portion; and a main rim, having a pair of internal flanges provided with an annular bead receiving channel in each flange, mounted on said tire casing so that said internal flanges are disposed between said side plate and the peripheral flange of said hub portion and each bead on said tire casing fits into the bead receiving channel in the adjacent internal flange of said main rim.

10. In a resilient wheel, the combination of a hub portion having a peripheral flange; a side plate secured to said hub portion; a pneumatic tire casing, having an endless slot in its outer periphery and provided with an annular bead along each peripheral edge, mounted between said side plate and the peripheral flange of said hub portion; a main rim, having a pair of internal flanges provided with an annular bead receiving channel in each flange, mounted on said tire casing so that said internal flanges are disposed between said side plate and the peripheral flange of said hub portion, and each bead on said tire casing fits into the bead receiving channel in the adjacent internal flange of said main rim; an auxiliary rim, provided with a series of anchoring brackets, mounted on said main rim; and a tread mounted on said auxiliary rim and secured thereto by said anchoring brackets.

11. In a resilient wheel of the class described, the combination of a pneumatic tire casing having an endless slot in its outer periphery and an annular bead along each outer peripheral edge; a rigid integral rim provided with internal grooves, and a pair of internal flanges, each flange being provided with an annular bead receiving channel; a hoop disposed in said rim so as to cover said internal grooves and form dead air spaces; said rim being disposed on said tire casing so that each annular bead fits into the bead receiving channel of the adjacent internal flange of said rim.

ANDREW J. PARK.